(12) United States Patent
Takahashi et al.

(10) Patent No.: US 8,466,615 B2
(45) Date of Patent: Jun. 18, 2013

(54) EL FUNCTIONAL FILM AND EL ELEMENT

(75) Inventors: Masaki Takahashi, Tokyo (JP); Yoshihiko Yano, Tokyo (JP); Tomoyuki Oike, Tokyo (JP); Naruki Kataoka, Tokyo (JP)

(73) Assignee: Ifire IP Corporation (CA)

( * ) Notice: Subject to any disclaimer, the term of this patent is extended or adjusted under 35 U.S.C. 154(b) by 976 days.

(21) Appl. No.: 10/547,399

(22) PCT Filed: Feb. 27, 2004

(86) PCT No.: PCT/JP2004/002391
§ 371 (c)(1),
(2), (4) Date: Jul. 28, 2006

(87) PCT Pub. No.: WO2004/077887
PCT Pub. Date: Sep. 10, 2004

(65) Prior Publication Data
US 2007/0013300 A1    Jan. 18, 2007

(30) Foreign Application Priority Data
Feb. 28, 2003  (JP) ................................ P2003-055040

(51) Int. Cl.
*H05B 33/14* (2006.01)
*H01J 1/62* (2006.01)

(52) U.S. Cl.
USPC .................................. 313/506; 252/301.4 R

(58) Field of Classification Search
USPC ................ 313/495–512; 252/301 R, 301.6 S, 252/301.4 R, 301.16; 428/690, 917, 411.1; 445/24, 25
See application file for complete search history.

(56) References Cited

U.S. PATENT DOCUMENTS

| | | | | |
|---|---|---|---|---|
| 4,737,684 A | * | 4/1988 | Seto et al. | 313/503 |
| 4,751,427 A | | 6/1988 | Barrow et al. | |
| 5,585,695 A | * | 12/1996 | Kitai | 313/506 |
| 5,725,801 A | * | 3/1998 | Kitai et al. | 252/301.4 R |
| 6,036,823 A | * | 3/2000 | Inoguchi et al. | 204/192.15 |
| 6,316,874 B1 | * | 11/2001 | Arai et al. | 313/504 |

(Continued)

FOREIGN PATENT DOCUMENTS

| | | |
|---|---|---|
| JP | 1-206594 | 8/1989 |
| JP | 2-51891 | 2/1990 |

(Continued)

OTHER PUBLICATIONS

New RGB Phosphors for Full Color Inorganic EL Display; Corporate R&D Center, TDK Corporation; 2-15-7, Higashi-Ohwad,Ichikawa-Shi Chiba, 272-8558, Japan; EL 2002 Session 2: Inorganic EL Materials-9:00; Yshihiko Yano, Tomoyuki Oike and Katsuto Nagano.*

(Continued)

*Primary Examiner* — Anh Mai
*Assistant Examiner* — Elmito Breval
(74) *Attorney, Agent, or Firm* — Ostrolenk Faber LLP

(57) ABSTRACT

An EL element 1 comprises EL functional layers 6, 10 comprising $Ga_2O_3$:Eu between a thick film insulator layer 16 and an upper electrode 12 provided on a substrate 2 on which a lower electrode 4 was formed and a light-emitting layer 8 comprising $MgGa_2O_4$ formed therebetween. The EL functional layers 6, 10 have the dual functions of insulating layers and electron doping layers. Due to this, the EL element 1 has a low drive voltage and high light-emitting brightness, and the structure of the EL element is simplified.

9 Claims, 4 Drawing Sheets

U.S. PATENT DOCUMENTS

| | | | |
|---|---|---|---|
| 2001/0015619 A1* | 8/2001 | Nagano et al. | 313/506 |
| 2002/0037430 A1* | 3/2002 | Takeishi et al. | 428/690 |
| 2002/0187366 A1* | 12/2002 | Hamada et al. | 428/690 |
| 2004/0170864 A1 | 9/2004 | Liu | |

FOREIGN PATENT DOCUMENTS

| | | |
|---|---|---|
| JP | 2-148688 | 6/1990 |
| JP | 10-152680 * | 6/1998 |
| JP | 10 152680 A | 6/1998 |
| JP | 10-270168 | 10/1998 |
| JP | 2002-216966 * | 8/2002 |
| JP | 2002-216966 A | 8/2002 |
| JP | 2003-45660 | 2/2003 |
| JP | 2003-45660 A | 2/2003 |
| JP | 2003-301171 | 10/2003 |
| JP | 2003-301171 A | 10/2003 |
| JP | 2004-079834 | 3/2004 |
| JP | 2004 79834 A | 3/2004 |
| JP | 2004-139979 | 5/2004 |
| JP | 2004-139979 A | 5/2004 |
| WO | WO 97/02721 | 1/1997 |
| WO | WO 98/33359 | 7/1998 |

OTHER PUBLICATIONS

Minami, Tadatsugu, "Oxide Phosphor Thin-Film Electroluminescent Devices", *Display and Imaging,* vol. 8, p. 83-93 (1999).

Ohura, et al., Properties of Red-Color CaS:Eu thin film EL device, *ITEJ Technical Report,* vol. 16, No. 76, p. 7-12 (1992).

International Search Report issued Jun. 8, 2004.

International Search Report PCT/JP2004/002391 dated May 25, 2004.

* cited by examiner

EL FUNCTIONAL FILM AND EL ELEMENT

CROSS REFERENCE TO RELATED APPLICATIONS

The present application is a 35 U.S.C. §371 national phase conversion of International Application No. PCT/JP2004/002391 filed 27 Feb. 2004, which claims priority from Japanese Patent application No. 2003-055040 filed 28 Feb. 2003; incorporated herein by reference.

TECHNICAL FIELD

The present invention relates to an EL functional film and an EL element.

BACKGROUND ART

Electroluminescence (in the invention, "EL") elements may be broadly divided into inorganic EL elements and organic EL elements according to the difference of component materials of the light-emitting body. Inorganic EL elements which use inorganic materials for the light-emitting body have the characteristic of a long light-emission life as compared with organic EL elements which use organic materials for the light-emitting body, and are mainly used in applications requiring high durability, such as the backlight of a clock, LCD (liquid crystal display) or in-vehicle monitor.

FIG. 3 is a perspective view showing the principal parts of the typical construction of a prior art inorganic EL element. An EL element 20 is a double insulation type thin film EL element, wherein stripe-like lower electrodes 22, lower insulator layer 24, light-emitting layer 26, upper insulator layer 28 and stripe-like upper electrode 30 are laminated in this order on a transparent substrate 21 having electrical insulation properties.

The transparent substrate 21 is a blue plate glass used generally for LCD or PDP (plasma display panels). The lower electrodes 22 are generally comprised of ITO (Indium Tin Oxide) having a thickness of about 0.1-1 μm. On the other hand, the upper electrode 30 is comprised of a metal such as aluminum. The lower insulator layer 24 and the upper insulator layer 28 are comprised of thin films having a thickness of about 0.1-1 μm formed by sputtering, vapor deposition or the like, and are generally consist of $Y_2O_3$, $Ta_2O_5$, AlN or $BaTiO_3$. The light-emitting layer 26 generally comprises a light-emitting body containing a dopant which is a emission center, and its thickness is usually about 0.05-1 μm.

In the prior art EL element having this construction, one of the lower electrode 22 and the upper electrode 30 is a line electrode whereas the other is a row electrode, and their direction of extending portions intersect with each other. In other words, a matrix electrode is formed by the electrodes 22, 30, and the light-emitting layer 26 at the intersection of the line electrode and row electrode is a pixel. By selectively applying an alternating voltage or pulse voltage to the pixels formed by this matrix electrode from an alternating current generator 32, the light-emitting layer 26 exhibits electroluminescence, and the radiated light is extracted from the transparent substrate 21 side.

In order to use the inorganic EL element having such a construction for display applications such as personal computers and televisions, color is inevitably required. For this purpose, light-emitting bodies which emit light corresponding to the three primary colors red (R), green (G) and blue (B) are needed.

Examples of light-emitting bodies which can emit light of each color include the blue light-emitting bodies of the light-emitting body which contains SrS as parent material and Ce as emission center (hereafter, "SrS:Ce"), $SrGa_2S_4$:Ce, and ZnS:Tm, the red light-emitting bodies of ZnS:Sm and CaS:Eu, and the green light-emitting bodies of ZnS:Tb and CaS:Ce.

However, no material was available which simultaneously satisfied the two criteria of light-emitting brightness and color purity in these light-emitting bodies, and color filters had to be interposed in order to obtain light-emission of each of the pure colors RGB respectively. Therefore, if this prior art inorganic EL element was used for a display application, for example, the intensity (brightness) of the light emission was inadequate.

To overcome this inconvenience and to improve the light-emitting intensity, an inorganic EL element having for example a 5-layer structure comprising a carrier doping layer interposed between a light-emitting layer and an insulator layer, is disclosed in U.S. Pat. No. 4,751,427.

FIG. 4 is a schematic cross-sectional view showing the essential parts of a typical construction of an inorganic EL element comprising a carrier doping layer. An EL element 40 is a double insulation type thin film EL element similar to the EL element 20. A transparent electrode 42, $Al_2O_3$ lower insulator layer 44, ZnS layer 46, $SrS:CeF_3$ light-emitting layer 48, ZnS layer 50, $Al_2O_3$ upper insulator layer 52 and aluminum upper electrode 54 are laminated in this order on a glass substrate 41. An alternating current generator 56 is connected to the transparent electrode 42 and the aluminum upper electrode 54.

In the EL element 40 having this construction, ZnS layers 46, 50 are buffer layers interposed between each of the insulator layers 44, 52 and the light-emitting layer 48, and have the function of a carrier doping layer. This enhances the electron doping of the light-emitting layer 48, and as a result, the light-emitting brightness and light-emitting efficiency of the inorganic EL element improve. Moreover, since electron doping is easier, the voltage (light emission threshold voltage in the curve (L-V curve) showing brightness-voltage characteristics) required to produce an effective light emission decreases, the steepness of the characteristic curve increases, the load of the drive circuit element is reduced and power consumption is reduced.

DISCLOSURE OF THE INVENTION

Recently, there has been a demand for displays with still higher brightness, high contrast, high detail, low power consumption and reliability. However, even in the case of an inorganic EL element comprising a light-emitting body having the aforesaid 5-layer structure of the prior art, this demand is not fully satisfied. Moreover, by using buffer layers as in the aforesaid element, the number of manufacturing steps required to produce the EL element increases, but from the viewpoint of cost-efficiency, it is preferred to simplify the structure as much as possible.

It is therefore an object of the present invention, which was conceived in view of the aforesaid situation, to provide an EL functional film and EL element which permit further reduction of drive voltage, enhancement of light-emitting brightness and simplification of the element structure.

As a result of intensive research, the Inventors found that by laminating a specific film having insulation properties, the excitation and emission efficiency of electrons captured at the interface level of the light-emitting layer and the film can be increased, and thus arrived at the present invention.

The EL functional film according to the invention, therefore, is an EL functional film used for an EL element comprising plural electrodes and a light-emitting layer between these electrode layers having a parent material comprising at least one of a first metal oxide and a metal sulfide, the parent material being doped with a emission center, wherein: the EL functional film is disposed between said electrode layers, is provided on at least one side of said light-emitting layer, and contains a second metal oxide as a principal component.

The EL functional film formed in this way simultaneously has the functions of both the insulator layers 44, 52 and the ZnS layers 46, 50 which are the carrier doping layers in the prior art inorganic EL element mentioned above. Specifically, it was found that, the EL functional film of the invention is not mere insulating layer between the electrode layer and light-emitting layer, the EL functional film enhances the electron doping to the light-emitting layer, because the film contains the second metal oxide as a principal component.

Although the details of this mechanism are not yet fully understood, it may be conjectured that the distribution of the capture level formed at the interface of the light-emitting layer and the EL functional film and the change in its density tending to increase the doping efficiency due to electronic thermal excitation, the increased drop of barrier energy due to the electric field effect, or the increase of electron tunneling probability due to electric field discharge, may be one factor. However, the mechanism is not limited thereto.

Therefore, due to the EL functional film, the electron doping efficiency in the light-emitting layer is enhanced even with an applied voltage equivalent to that of the prior art. Further, since insulation and carrier doping can be better supported, the laminated structure is simplified compared to the inorganic EL element of the prior art 5-layer structure, and so decrease of electric field due to voltage loss originating for example in the insulator layers 44, 52 is suppressed. When the light-emitting layer is formed mainly of an oxide like the EL functional film, the covering property of both can be enhanced. Moreover, weatherability can be improved as compared with the case where the ZnS layers 46, 50 are used for the carrier doping layer.

The second metal oxide contained in the EL functional film preferably contains metal elements which are identical to at least one of the metal elements forming the first metal oxide or metal sulfide. Since the crystal compatibility or compositional compatibility between the EL functional film and light-emitting layer is thereby improved, the adhesion properties of both are further enhanced. However, the mechanism is not limited thereto.

More specifically, a Ga oxide, rare earth metal oxide, Zn oxide or Al oxide is preferably used as the second metal oxide. Among these, a Ga oxide is more preferred, and stoichiometrically, $Ga_2O_3$ or an oxide with similar stoichiometry is particularly useful, as described later.

The second metal oxide comprises said second metal oxide doped with metal element. If this is done, electron displacement in the EL functional film is smoother, electron doping of the light-emitting layer is enhanced and light-emitting efficiency is improved. It is more preferred that the metal element used for doping is the same metal element as that contained in the emission center of the light-emitting layer. In this case, even if electroluminescence occurs in the EL functional film, the light emission color is similar to the color of the light-emitting layer. Therefore, degradation of color purity is suppressed.

The first metal oxide (parent material of the light-emitting layer) preferably contains a Mg atom, Ga atom and O atom, more preferably $Mg_xGa_yO_z$ (magnesium gallate), and still more preferably $MgGa_2O_4$ or a three-element composition similar thereto. The light-emitting layer using this metal oxide not only has a large light-emitting brightness as compared with a light-emitting body of the sulfide type, but also, the time (response time) after applying a voltage until the light-emission stabilizes is relatively short. It was found that when the EL functional film of the invention was combined with such a light-emitting layer, the electron doping effect was particularly enhanced.

Additionally, it was found that in the case of a light-emitting layer wherein the emission center with which the parent material comprising the first metal oxide and metal sulfide is doped is Eu, the electron doping effect was greatly increased. In particular, when the light-emitting layer was $MgGa_2O_4$:Eu, the effect was even more remarkable.

The second metal oxide is a Ga oxide ($Ga_2O_3$), and it is particularly preferred that in the EL functional film of the invention, the metal element doped in the second metal oxide is Eu, i.e., $Ga_2O_3$:Eu. It has now been found that the EL functional film is most preferably used in combination with a light-emitting layer having Eu as the emission center, as described above, and in particular, a light-emitting layer which emits red light.

The EL element of the invention may conveniently use the EL functional film of the invention, and comprises a first electrode layer, a second electrode layer disposed opposite this first electrode layer, a light-emitting layer disposed between the first and second electrode layers, wherein the emission center in the parent material comprising at least one of the first metal oxide and a metal sulfide, is doped, and an EL functional layer disposed between the first and second electrode layers, formed on at least one side of the light-emitting layer, and containing a second metal oxide as a principal component.

The second metal oxide is preferably a Ga oxide, rare earth metal oxide, Zn oxide or Al oxide, among which a Ga oxide is more preferred. It is particularly useful if the second metal oxide is doped with Eu.

BEST MODES FOR CARRYING OUT THE INVENTION

Figure 1:
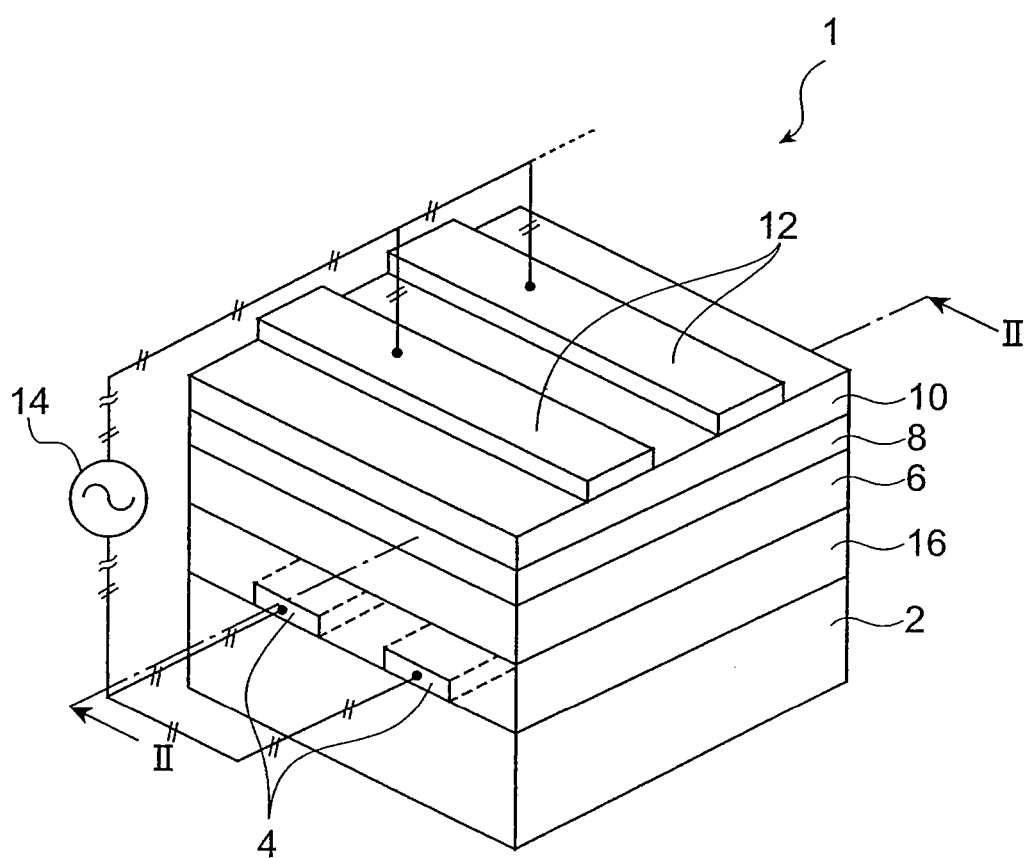
FIG. 1 is a perspective view showing the essential parts of a typical construction of the EL element according to the present invention.

Hereafter, one embodiment of the invention will be described in detail referring to the drawings. Identical symbols are assigned to identical elements, and their description is not repeated. The spatial relationship of top, bottom, left and right is based on the spatial relationship in the drawings.

Figure 2:
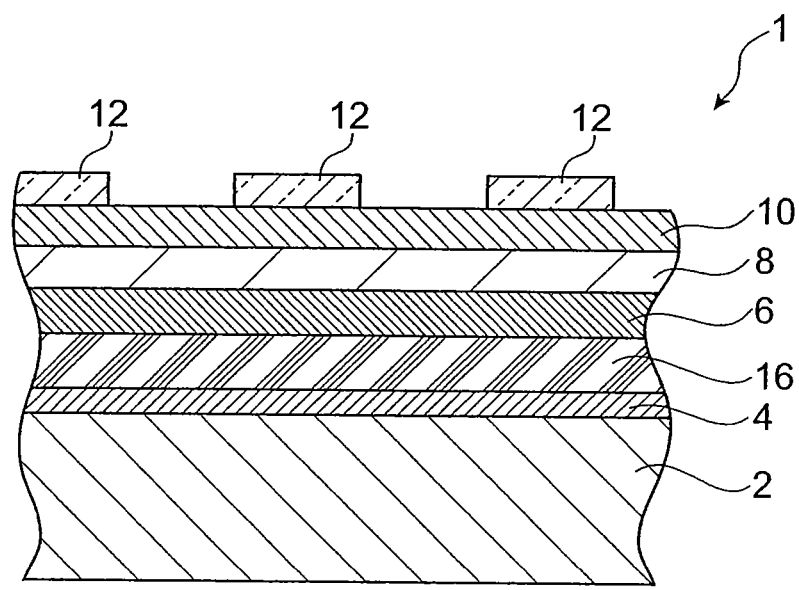
FIG. 2 is a schematic sectional view showing the essential parts of a cross-section along a line II-II in FIG. 1.
Figure 3:
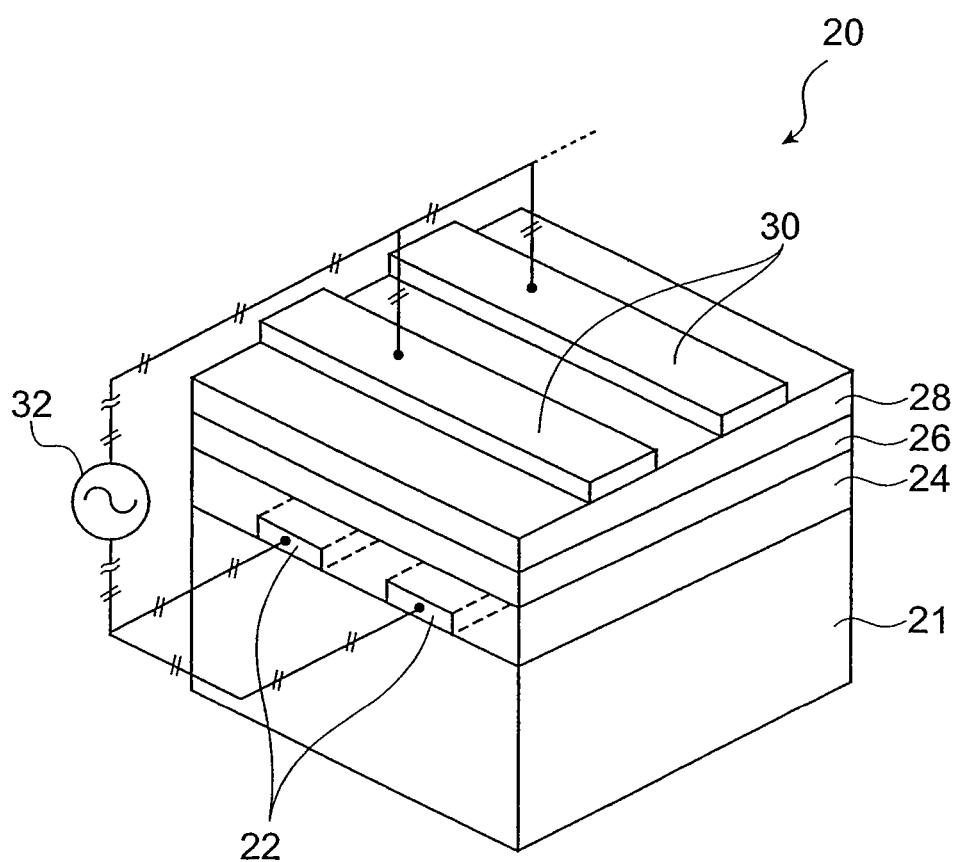
FIG. 3 is a perspective view showing the essential parts of a typical construction of a prior art inorganic EL element.
Figure 4:
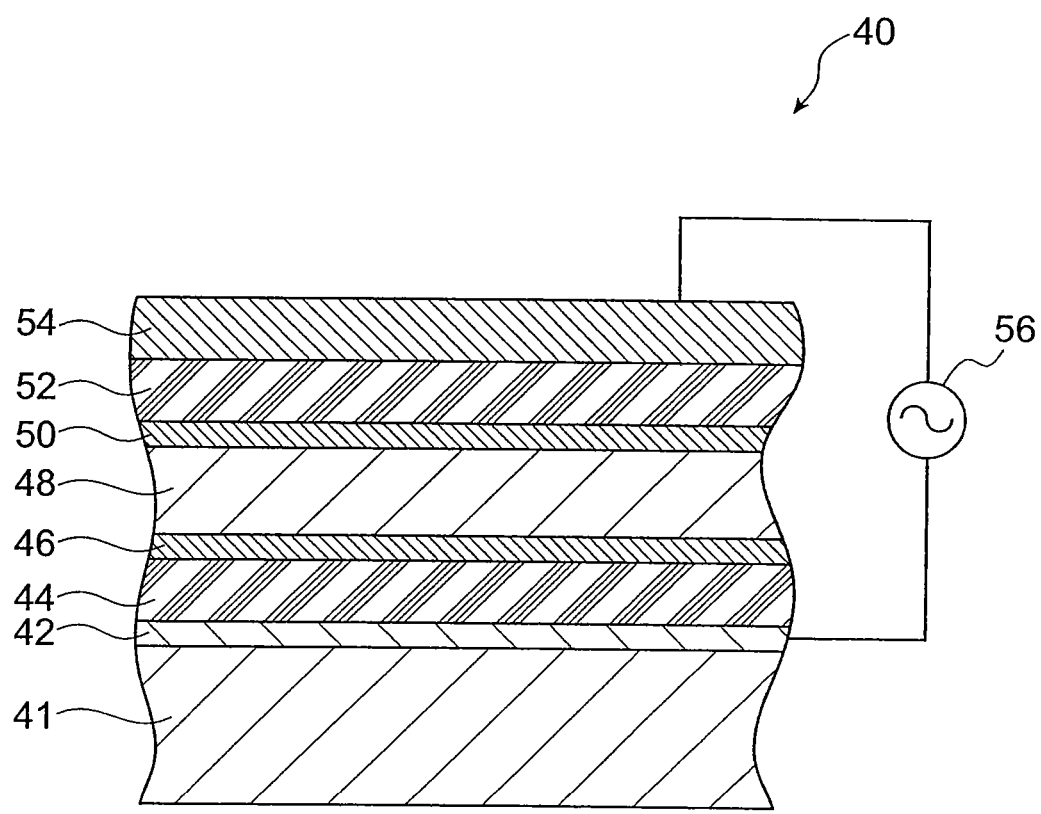
FIG. 4 is a schematic sectional view showing the essential parts of a typical construction of an inorganic EL element in which an electron doping layer was provided.

FIG. 1 is a perspective view showing the essential parts of a typical construction of an EL element according to the invention. FIG. 2 is a schematic sectional view showing the essential parts of a cross-section along a line II-II in FIG. 1. An EL element 1 is a double insulation type thin film inorganic EL element of the top emission type. In this EL element 1, a lower electrode 4 (first electrode layer), thick film insulator layer 16, EL functional layer 6 (EL functional film), light-emitting layer 8, EL functional layer 10 (EL functional film) and upper electrode 12 (second electrode layer) are laminated in this order on a substrate 2. An alternating current generator 14 is connected to the lower electrode 4 and the upper electrode 12. First, each layer forming the EL element 1 will be described.

(Substrate 2)

The substrate 2 permits each layer in the EL element 1 to be formed above it. It is not particularly limited provided that it does not present a risk of contaminating the EL functional layer 6 formed above it, and preferably has a heat-resisting property which can withstand the annealing temperature used in the annealing treatment which is performed when the EL element 1 is formed.

Specifically, materials may be mentioned that have a heat-resistance temperature or fusing point of preferably 600° C. or more, more preferably 700° C. or more and still more preferably 800° C. or more. Examples of substrates having such properties are ceramic substrates having alumina ($Al_2O_3$), forsterite ($2MgO-SiO_2$), steatite ($MgO-SiO_2$), mullite ($3Al_2O_3,2SiO_2$), beryllia (BeO), aluminum nitride (AlN), silicon nitride ($Si_3N_4$) or silicon carbide (SiC) as principal components, sintered glass ceramic substrates containing glass powder with these materials as fillers, and crystallized glass substrates containing an alkaline earth crystallization component.

(Lower electrode 4)

The lower electrode 4 is disposed on the substrate 2 so that plural stripe-like electrodes extend in a certain direction at a constant interval. This lower electrode 4 has a predetermined high conductivity, is preferably formed of a material which is not easily damaged by the high temperature or oxidizing atmosphere used in annealing treatment, and more preferably has very low reactivity with the EL functional layer 6 and the light-emitting layer 8 which are formed further up.

Specifically, the material of the lower electrode 4 is a metallic material. Preferred examples are noble metals such as Au, Pt, Pd, Ir, Ag, noble metal alloys such as Au—Pd, Au—Pt, Ag—Pd, Ag—Pt, and alloys having noble metals as their principal components to which base metals are added such as Ag—Pd—Cu. By using these metallic materials, the resistance to high temperature or an oxidizing atmosphere is much increased.

(Thick film insulator layer 16)

The thick film insulator layer 16 is formed on the substrate 2 on which the lower electrode 4 was formed. The material of this thick film insulator layer is preferably a ceramics material. Specific examples are (ferro)dielectric material having a perovskite structure such as $BaTiO_3$, $(Ba_xCa_{1-x})TiO_3$, $(Ba_xSr_{1-x})TiO_3$, $PbTiO_3$, PZT or PLZT, compound perovskite relaxer type ferroelectric materials such as PMN ($Pb(Mg_{1/3}Nb_{2/3})O_3$), bismuth laminar compounds such as $Bi_4Ti_3O_{12}$ or $SrBi_2Ta_2O_9$, and tungsten bronze type ferroelectric materials such as $(Sr_xBa_{1-x})Nb_2O_6$ and $PbNb_2O_6$. "PZT" means $Pb(Zr_xTi_{1-x})O_3$.

Among these, those of perovskite structure such as $BaTiO_3$, PZT and PMN are preferred since the baking process performed when the insulator layer is formed is relatively easy. Hence, by forming the thick film insulator layer 16 on the substrate 2 on which the lower electrode 4 was formed, any unevenness of the substrate surface or the unevenness due to the lower electrode 4 is covered, the contact surface with the EL functional layers 6, 10 described later is flattened, and abnormalities of local light-emitting characteristics and pressure-resisting defects due to this unevenness are much reduced.

(EL functional layers 6 and 10)

As in the illustration, the EL functional layers 6, 10 are disposed between the lower electrode 4 and upper electrode 12, and are laminated on the light-emitting layer 8, respectively. The EL functional layers 6, 10 comprise EL functional films which contain a metal oxide (the second metal oxide) as a principal component. The metal oxide is preferably a Ga oxide, rare earth metal oxide, Zn oxide or Al oxide, these more preferably being the oxides having the chemical compositions $Ga_2O_3$, $Ln_2O_3$, ZnO and $Al_2O_3$, respectively. Among these, a Ga oxide or a Zn oxide is more preferred, and a Ga oxide is particularly preferred.

The aforesaid metal oxide preferably contains metal elements which are identical to at least one of the metal elements forming the metal oxide (first metal oxide) or metal sulfide forming the parent material (matrix) of the light-emitting layer 8, described later. Specifically, when for example the parent material constituting the light-emitting layer 8 is a metal oxide containing a Mg atom, a Ga atom and O atom, and particularly magnesium gallate, it is preferred that the EL functional layers 6, 10 are of Ga oxide.

Still more preferably, the EL functional layers 6, 10 are doped with a metal element. This dopant element may be one of the materials used in the prior art, specifically, a rare earth element such as Sc, Y, La, Ce, Pr, Nd, Gd, Tb, Ho, Er, Tm, Lu, Sm, Eu, Dy, Yb, or a transition metal element such as Mn, Pb, Bi, Cr.

From the viewpoint of preventing the color purity of the light-emission of the EL element 1 from degrading, this metal element preferably has a light emission of the same color as that of the light-emitting layer 8. It is particularly preferred that it is identical to the metal element forming the emission center contained in the light-emitting layer 8.

Specifically, when the light-emitting layer 8 is a blue light-emitting body, Tm or Ce are for example preferred, when it is a green light-emitting body, Tb or Ho are for example preferred, and when it is a red light-emitting body, Cr, Eu, Pr, Sm, Yb, or Nd are for example preferred.

These metal elements are not necessarily limited to the above-mentioned combinations which may be suitably varied according to other conditions, and two or more metal elements may also be combined. Among combinations of these parent materials and dopant elements, it is particularly preferred that the EL functional layers 6, 10 are of $Ga_2O_3$:Eu.

Here, the thickness of the EL functional layers 6, 10 is preferably 1-100 nm, more preferably 3-60 nm, still more preferably 5-30 nm and most preferably 10 nm. If the thickness of the EL functional layers 6, 10 is less than 1 nm, it tends to be difficult to obtain an electron doping effect. On the other hand, if it exceeds 100 nm, there is a tendency for the drive voltage to be too high.

(Light-Emitting Layer 8)

In the light-emitting layer 8, the element which is the emission center in the parent material formed of at least one metal oxide (first metal oxide) and metal sulfide, is doped. At least one metal oxide and metal sulfide used for the parent material may be one which is generally used for light-emitting body materials. Examples are metal sulfides such as Zn sulfide and Sr sulfide, and a two-element metal sulfide such as ZnS or a composite metal sulfide such as BaAlS may be used. When using BaAlS as a composite metal sulfide, the Ba atom may be partly replaced by another metal atom such as Mg, and the S atom may be partly replaced by an oxygen atom. If substitution by Mg is excessive, BaAlS and MgS may be separated as two layers.

As the metal oxide, a two-element metal oxide or a composite metal oxide can be used. Examples of a two-element metal oxide are a Ga oxide ($Ga_2O_3$ or GaO), rare earth metal oxide ($Ln_2O_3$), Ge oxide ($GeO_2$) or Sn oxide ($SnO_2$). The formulae inside the parentheses show the typical chemical composition of each metal oxide, but the composition is not necessarily limited thereto. Examples of a composite metal oxide are oxides containing Mg, Ca, Sr, Ba or Zn and Ga, Al, B or In. Among these, it is more preferred that Mg and Ga are contained as essential ingredients, magnesium gallate expressed by $Mg_xGa_yO_z$ being particularly preferred.

When the parent material of the light-emitting layer 8 is magnesium gallate, the molar ratio (Ga/Mg) of Ga atoms and Mg atoms is preferably 1-3, more preferably 1.1-2.5, still more preferably 1.2-2.2 and most preferably about 1.6. When this Ga/Mg ratio is less than 1, or when it is greater than 3, there is a tendency for the light-emitting brightness to fall. Also, among magnesium gallate, $MgGa_2O_4$ or materials having a similar chemical composition are preferred.

As the metal element forming the emission center, the rare earth elements or transition metal elements used as the emission center in the prior art EL element can be used without limitation. For example, the same element as the dopant element which may be contained in the EL functional layers 6, 10 mentioned above, may be selected according to the desired light-emitting color. As emission center, two or more metal elements may be combined.

If the metal oxide forming the parent material mentioned above is a Mg—Ga—O type oxide such as magnesium gallate, the dopant element is preferably Eu or Th, but is more preferably Eu. A Mg—Ga—O type oxide is a particularly good host of $Eu^{3+}$, and red light of high brightness and high purity can be obtained with this combination.

The content of these dopant elements is preferably 0.1-10 mol % relative to the total molar amount of the metal element contained in the metal oxide which is the parent material. If this content is less than 0.1 mol %, there is a tendency for sufficient light-emitting brightness to no longer be obtained since there are few emission centers. On the other hand, if 10 mol % is exceeded, there is a tendency for concentration quenching to occur due to the emission centers themselves, so the light-emitting brightness falls.

Here, the thickness of the light-emitting layer 8 is preferably 50-700 nm, more preferably 100-300 nm, still more preferably 100-200 nm and most preferably about 150 nm. If the thickness is less than 50 nm, there is a possibility that the light-emitting brightness will fall to an inconvenient level, and if it exceeds 700 nm, there is a tendency for the light emission threshold voltage to rise too much.

(Upper Electrode 12)

The upper electrode 12 is disposed on the EL functional layer 10 so that plural band electrodes extend in a planar direction perpendicular to the laying direction of the lower electrode 4 at a fixed interval. The upper electrode 12 is a top emission type, and therefore comprises transparent electrical conducting materials. Examples of this transparent electrical conducting material are oxide conductive materials such as $In_2O_3$, $SnO_2$, ITO or ZnO—Al. The thickness of the upper electrode 12 is usually 0.2-1 μm.

(Method of Manufacturing the EL Element 1)

Next, an example of manufacturing the EL element 1 formed in this way will be described. First, the substrate 2 which comprises a ceramics substrate, a glass ceramic substrate or a crystallized glass substrate is prepared. Next, the lower electrode 4 is formed in a strip shape on this substrate 2. The method is not particularly limited, for example it can be formed by the printing method using powdered metal paste or organic metal paste (resinate metal paste), or the etching process which is generally used.

Next, the thick film insulator layer 16 is formed on the substrate 2 on which the lower electrode 4 was formed. Specifically, a thick film paste comprising a mixture of a binder, dispersant and solvent with a ceramic material powder is applied to the substrate 2, and dried to form a thick film green. This thick film green is then calcinated at a predetermined temperature to form an insulator layer. Alternatively, a solution coating calcination method such as the sol-gel method, or the MOD (metallo-organic decomposition) method, may be used.

Next, the EL functional layer 6 is formed on the thick film insulator layer 16 by EB (electron beam) vapor deposition or sputtering using the materials (metal oxides, etc.) of the EL functional layer 6 made into pellets as a target. Specifically, when forming the EL functional layer 6 which comprises $Ga_2O_3$:Eu by EB vapor deposition, for example, a pellet of Ga oxide and a pellet of Eu oxide are produced, and EB vapor deposition is carried out on the substrate 2 in a chamber into which $O_2$ gas is introduced using these two pellets as a target. The Eu doped in this case does not necessarily need to be in the form of an oxide, and a metal, fluoride or sulfide may also be used.

The substrate temperature during EB vapor deposition is usually room temperature-600° C., but is preferably 150-300° C. The chamber internal pressure during vapor deposition is usually $1.33 \times 10^{-4}$ to $1.33 \cdot 10^{-1}$ Pa, but is preferably $6.65 \times 10^{-3}$ to $6.65 \cdot 10^{-2}$ Pa. It is preferred to displace or rotate the substrate 2 during vapor deposition from the viewpoint of making the film composition uniform and of lessening dispersion in the thickness distribution.

Next, the light-emitting layer 8 is formed on the EL functional layer 6 by EB vapor deposition or sputtering, using the pellets of materials (metal oxide, dopant element) forming the light-emitting layer 8 as target. Specifically, for example, when the light-emitting layer 8 comprising $MgGa_2O_4$:Eu by EB vapor deposition is formed by EB vapor deposition, after producing the Mg oxide pellets to which Ga oxide and Eu are added, EB vapor deposition is carried out on the EL functional layer 6 in a chamber into which $O_2$ gas is introduced using these two pellets as target. The added Eu may be in the form of a metal, oxide, fluoride or sulfide. The substrate temperature and chamber internal pressure during vapor deposition may be identical to those for the aforesaid EL functional layer 6.

After forming the light-emitting layer 8 in this way, it is preferred to perform annealing treatment. Annealing treatment may be performed immediately after forming the light-emitting layer 8 (i.e., the state where the light-emitting layer 8 is exposed) and forming the EL functional layer 10, or after forming the upper electrode 12.

As for this annealing treatment, it is preferably performed in the atmosphere, or in a nitrogen atmosphere, argon atmosphere, sulfur vapor atmosphere, hydrogen sulfide atmosphere or oxygen atmosphere, and in particular an oxidizing atmosphere. The ambient pressure in this case should be selected as high vacuum-atmospheric pressure. Here, the state of an oxygen concentration equivalent to or higher than that of the atmosphere is referred to as an oxidizing atmosphere. By annealing in an oxidizing atmosphere, crystallization of the light-emitting layer 8 is promoted and light-emitting brightness can be further enhanced.

The annealing temperature is in the range of 500-1000° C., but preferably in the range of 600-800° C. The annealing time is usually about 1 to 60 minutes, but preferably 5 to 30 minutes. If the annealing temperature is lower than 500° C. or the annealing time is less than 1 minute, it is difficult to sufficiently increase the light-emitting brightness, whereas if the annealing temperature is higher than 1000° C. or the annealing time exceeds 60 minutes, there is a possibility that structural components other than the light-emitting layer 8 in the EL element 1 may be damaged.

Next, after forming the EL functional layer 10 as with the formation of the EL functional layer 6 on the light-emitting layer 8, the strip-like upper electrode 12 is formed thereupon by methods known in the art, such as vapor deposition, sputtering, CVD, the sol-gel method or printing calcination, and the EL element 1 is thereby obtained.

With the EL element 1 formed in this way, the action and effect described below are obtained. For example, if $Ga_2O_3$:Eu is used for the EL functional layers 6, 10, and $MgGa_2O_4$:Eu is used for the light-emitting layer 8, when the light-emitting layer 8 is covered by the EL functional layers 6, 10, there is a change of distribution and density of the capture level formed at the interfaces of the light-emitting layer 8 and EL functional layers 6, 10, an increase in the drop of barrier energy due to the electric field effect, or theoretically, an increase in the electron tunneling probability due to more narrowing of the barrier potential than previously, and electron doping of the light-emitting layer 8 is enhanced. In particular, since the EL functional layers 6, 10 containing $Ga_2O_3$ have a remarkable effect of increasing the electron tunneling probability, the electron doping efficiency of the light-emitting layer 8 is remarkably enhanced.

Moreover, in this case, since the light-emitting layer 8 and EL functional layers 6, 10 comprise metal oxides both containing Ga, crystal compatibility and compositional compatibility are good. The covering properties of both layers are thereby increased, peeling is reduced and weatherability is also improved. Since the EL functional layers 6, 10 serve as a lower insulator layer and an upper insulator layer, respectively, the element structure is simplified.

Therefore, according to this EL element 1, as compared with the prior art EL element in which a carrier doping layer was provided, the drive voltage can be further reduced and good light-emitting brightness is obtained, while at the same time, element life is greatly improved, the element can be made smaller and thinner, and the process can be shortened due to simplification of the element structure. Therefore, a display in which the EL element 1 is mounted has more brightness, finer detail and higher contrast, and visibility can be improved. Moreover, manufacturing costs can be reduced, cost-efficiency can be increased due to low power consumption, and reliability can be enhanced.

The EL element according to the invention is not limited to the aforesaid aspect, various modifications being possible to the extent that they do not depart from the spirit and scope of the invention. For example, other insulator layers may be provided between the lower electrode 4 and EL functional layer 6 and/or between the upper electrode 12 and EL functional layer 10. As for such other insulator layers, they are preferably filmy. In this case, the effect of limiting the electric current in the light-emitting layer 8 is further enhanced, and the withstand voltage characteristics of the EL element are good.

As the material of these other insulator layers, silicon oxide ($SiO_2$), silicon nitride ($Si_3N_4$), tantalum oxide ($Ta_2O_5$), strontium titanate ($SrTiO_3$), yttrium oxide ($Y_2O_3$), zirconia ($ZrO_2$), silicon oxynitride (SiON) and alumina ($Al_2O_3$) may be mentioned.

These insulator layers can be formed by gaseous phase deposition methods, such as sputtering, vapor deposition or CVD. However, from the viewpoint of simplifying the structure and the manufacturing process of the EL element 1, it is preferred to form only the EL functional layers 6, 10 respectively between the lower electrode 4 and light-emitting layer 8, and between the light-emitting layer 8 and upper electrode 12.

Further, other carrier doping layers such as a ZnS layer may be provided, for example between at least one of the EL functional layers 6 and 10, and the light-emitting layer 8 having an oxide as the parent (matrix) material. This is particularly useful when the EL functional layers 6, 10 are Ga oxides.

In this case, the electron doping effect of the EL functional layers 6, 10 and other carrier doping layers is reinforced, and as a result, the decrease of light emission threshold voltage and increase of light-emitting brightness are further enhanced. The EL functional layers 6, 10 and other carrier doping layers may both be situated on the light-emitting layer 8 side, but it is usually preferred that the other carrier doping layers are installed between the EL functional layers 6, 10 and the light-emitting layer 8.

In addition, a color filter layer having plural RGB cells may be provided on the upper electrode 12. In this case, when the light-emitting layer 8 is a white light-emitting body, full coloration can be easily attained. A color conversion layer having plural color conversion cells may also be provided on the upper electrode 12. In this case, when the light-emitting layer 8 is a monochrome light-emitting body emitting one of the colors RGB, full coloration can be easily attained.

EXAMPLES

Hereafter, the invention will be described in more detail referring to specific examples, but it should be understood that the invention is not to be construed as being limited thereto.

Example 1

First, $Al_2O_3$ as a substrate material was machined into a sheet shape to give a substrate 2. Next, after screen-stenciling an Au powder metal paste on this substrate 2, it was calcinated to form a lower electrode 4. Next, using PMN-PT($Pb(Mg_{1/3}Nb_{2/3})O_3$—$PbTiO_3$) as a thick film insulator layer material, this was formed into a powder, a binder, dispersant and solvent were added to form a thick film paste which was applied to the substrate 2 on which the lower electrode 4 was formed, dried, and calcinated to form a thick film insulator layer 16.

Next, after forming the EL functional layer 6 of $Al_2O_3$ on the thick film insulator layer 16 by vapor deposition using $Al_2O_3$ pellets, another carrier doping layer of ZnS was formed thereupon by vapor deposition using ZnS pellets. Further, the laminate was placed in a chamber containing an EB (electron beam) source into which $Ga_2O_3$ pellets were introduced, and an EB source into which MgO pellets with 15 mol % added Eu were introduced.

Next, $O_2$ gas (flow rate 10 sccm) was introduced into the chamber, the reactive gas starting materials were simultaneously vaporized from the EB sources, and while rotating the laminate obtained after forming the EL functional layer 6 heated to 150° C., a light-emitting layer 8 comprising $MgGa_2O_4$:Eu was formed on the EL functional layer 6. EB vapor deposition conditions were adjusted so that the film-forming rate of the light-emitting layer 8 was 1 nm/s.

Next, after forming an EL functional layer 10 on the light-emitting layer 8 in the same way as the EL functional layer 6, annealing treatment was given to the obtained laminate for 10 minutes in air at 650° C. An upper electrode 12 was then formed on the EL functional layer 10 after annealing treatment by RF magnetron sputtering using an ITO target, and lead wires were connected to the lower electrode 4 and upper electrode 12 to obtain the EL element of the invention.

Plural EL elements were manufactured by suitably varying the film-forming time in the first example so that the thickness of the EL functional layers 6, 10 of $Al_2O_3$ was a value in the range 5-100 nm, the thickness of the carrier doping layer of ZnS was a value in the range 50-200 nm, and the thickness of the light-emitting layer 8 was a value in the range 100-200 nm.

Example 2

Plural EL elements according to the invention were obtained as in the first example, except that the EL functional layers 6, 10 were layers of $Ga_2O_3$ as described below, and the other carrier doping layer of ZnS was not provided.

Specifically, while introducing $O_2$ gas (flow rate 10 sccm) into a chamber with an EB source into which $Ga_2O_3$ pellets had been introduced, a reactive gas starting material was vaporized from the EB source, and while rotating the laminate (laminate after forming the thick film insulator layer 16 or laminate after forming the light-emitting layer 8) heated to 150° C., the functional layers 6, 10 comprising $Ga_2O_3$ were formed on the thick film insulator layer 16 or the light-emitting layer 8.

Example 3

Plural EL elements were obtained as in Example 2, except that the EL functional layers 6, 10 were layers of $Ga_2O_3$:Eu as described below.

Specifically, while introducing $O_2$ gas (flow rate 10 sccm) into a chamber with an EB source into which $Ga_2O_3$ pellets had been introduced, and an EB source into which $Eu_2O_3$ pellets had been introduced, reactive gas starting materials were simultaneously vaporized from the EB sources, and while rotating the laminate (laminate after forming the thick film insulator layer 16 or laminate after forming the light-emitting layer 8) heated to 150° C., the EL functional layers 6, 10 were formed on the thick film insulator layer 16 or the light-emitting layer 8.

[Measurement of Light-Emitting Voltage and Relative Brightness]

As test sample (1), among the EL elements of Example 1, an element was selected wherein the thicknesses of the EL functional layers 6, 10 of $Al_2O_3$ were 30 and 70 nm, respectively, the thickness of the other carrier doping layer of ZnS was 100 nm, the thickness of the light-emitting layer 8 of $MgGa_2O_4$:Eu was 150 nm, the Eu content of the light-emitting layer 8 was 2.38 mol % and the Ga/Mg atomic composition ratio was 1.61.

As test sample (2), among the EL elements of Example 2, an element was selected wherein the thickness of the EL functional layers 6, 10 of $Ga_2O_3$ was 10 nm, the thickness of the light-emitting layer 8 of $MgGa_2O_4$:Eu was 150 nm, the Eu content of the light-emitting layer 8 was 2.38 mol % and the Ga/Mg atomic composition ratio was 1.61.

As test sample (3), among the EL elements of Example 2, an element was selected wherein the thicknesses of the EL functional layers 6, 10 of $Ga_2O_3$:Eu was 10 nm, the Eu content of the EL functional layers 6, 10 was 7.57 mol %, the thickness of the light-emitting layer 8 of $MgGa_2O_4$:Eu was 150 nm, the Eu content of the light-emitting layer 8 was 2.38 mol % and the Ga/Mg atomic composition ratio was 1.61.

Next, lead wires were connected to the lower electrode 4 and the upper electrode 12 of the test samples (1)-(3). An alternating current voltage was applied to both electrodes 4, 12 via the lead wires under the conditions of modulation voltage: L60, drive frequency: 1 kHz, applied voltage waveform: pulse (pulse width: 50 μs) and measured environmental temperature: 25° C. At this time, the voltage at which a light emission of 1 cd/m2 was obtained in the EL element of each test sample was taken as the "light emission threshold voltage", and the light emission brightness measured by further applying 60V over the light emission threshold voltage was taken as the measured brightness. The obtained results are summarized in TABLE 1.

TABLE 1

| Example | Test sample | EL functional layer | Light emission threshold voltage (V) | Measured brightness (cd/m2) |
| --- | --- | --- | --- | --- |
| 1 | 1 | $Al_2O_3$ + ZnS | 120 | 1816 |
| 2 | 2 | $Ga_2O_3$ | 100 | 3296 |
| 3 | 3 | $Ga_2O3$:Eu | 90 | 4152 |

From these results, it was found that for the EL element provided with the EL functional layers 6, 10, the light emission threshold was sufficiently low, and the relative brightness was sufficiently high. In particular, it was found that for the EL functional layers 6, 10 of $Ga_2O_3$ and $Ga_2O_3$:Eu (Examples 2 and 3), a very low light emission threshold of 100V or less was obtained, and the light-emitting brightness could be much increased to a very high level.

INDUSTRIAL APPLICABILITY

As described above, in an EL element provided with the EL functional film of the invention, a lower drive voltage can be achieved than in the prior art, the light-emitting brightness and light-emitting efficiency can be greatly enhanced, the element structure can be simplified and cost-efficiency can be improved. Due to this, the visibility and reliability of a display provided with the EL element of the invention can be enhanced, and power consumption can be reduced.

The invention claimed is:

1. An EL functional film used for an EL element, said EL element comprising plural electrode layers and a light-emitting layer provided between said electrode layers, the light-emitting layer comprising a parent material comprising $MgGa_2O_4$, the parent material being doped with an emission center, wherein:
   said EL functional film being provided in contact with at least one side of said light-emitting layer, and containing $Ga_2O_3$ or $Ga_2O_3$ doped with a rare earth metal element.

2. The EL functional film according to claim 1, wherein the metal element with which said gallium oxide is doped is an identical metal element to a metal element forming said emission center.

3. The EL functional film according to claim 2, wherein said gallium oxide is further doped with europium.

4. The EL functional film according to any one of claims 1 and 2, wherein said gallium oxide further includes a magnesium atom.

5. The EL functional film according to any one of claims 1 and 2, wherein said emission center is europium.

6. The EL functional film according to any one of claims 1 and 2, wherein said EL functional film is provided as a single layer between said electrode layers and said light-emitting layer.

7. An EL element, comprising:
a first electrode layer;
a second electrode layer provided opposite said first electrode layer;
a light-emitting layer provided between said first and second electrode layers, the light-emitting layer comprising a parent material comprising $MgGa_2O_4$, the parent material being doped with an emission center; and
an EL functional film disposed between said first and second electrode layers, provided in contact with at least one side of said light-emitting layer and containing a $Ga_2O_3$ or $Ga_2O_3$ doped with a rare earth metal element.

8. The EL functional film according to claim 7, wherein the metal element with which said gallium oxide is doped is an identical metal element to a metal element forming said emission center.

9. The EL element according to claim 8, wherein said gallium oxide is further doped with europium.

* * * * *

UNITED STATES PATENT AND TRADEMARK OFFICE
CERTIFICATE OF CORRECTION

PATENT NO.       : 8,466,615 B2                                                     Page 1 of 1
APPLICATION NO. : 10/547399
DATED            : June 18, 2013
INVENTOR(S)      : Takahashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1499 days.

Signed and Sealed this
Eighth Day of September, 2015

Michelle K. Lee
*Director of the United States Patent and Trademark Office*